(12) United States Patent
McGillin (10) Patent No.: US 9,189,504 B2
(45) Date of Patent: Nov. 17, 2015

(54) APPLICATION SOURCE CODE SCANNING FOR DATABASE MIGRATION

(71) Applicant: ORACLE INTERNATIONAL CORPORATION, Redwood Shores, CA (US)

(72) Inventor: Barry McGillin, Omagh (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 275 days.

(21) Appl. No.: 13/746,755

(22) Filed: Jan. 22, 2013

(65) Prior Publication Data

US 2014/0208290 A1    Jul. 24, 2014

(51) Int. Cl.
   *G06F 9/44*     (2006.01)
   *G06F 17/30*    (2006.01)
   *G06F 9/45*     (2006.01)

(52) U.S. Cl.
   CPC .............. *G06F 17/303* (2013.01); *G06F 8/51* (2013.01)

(58) Field of Classification Search
   USPC .......... 717/136, 168; 707/100, 110, 609, 679, 707/694, 810; 702/20; 715/234, 765
   IPC ................ G06N 5/022; G06F 17/303,19/28
   See application file for complete search history.

(56) References Cited

U.S. PATENT DOCUMENTS

| | | | |
|---|---|---|---|
| 6,996,589 B1* | 2/2006 | Jayaram et al. | 1/1 |
| 7,792,800 B1* | 9/2010 | Carson et al. | 707/640 |
| 2004/0034619 A1* | 2/2004 | Lu et al. | 707/1 |
| 2004/0068715 A1* | 4/2004 | Wong et al. | 717/136 |
| 2004/0194016 A1* | 9/2004 | Liggitt | 715/501.1 |
| 2005/0138606 A1* | 6/2005 | Basu et al. | 717/136 |
| 2006/0015839 A1* | 1/2006 | Owens et al. | 717/100 |
| 2007/0022129 A1* | 1/2007 | Bahar et al. | 707/100 |
| 2007/0214099 A1* | 9/2007 | Marfatia et al. | 706/20 |
| 2012/0131567 A1* | 5/2012 | Barros et al. | 717/170 |
| 2012/0265726 A1* | 10/2012 | Padmanabhan et al. | 707/602 |
| 2012/0330911 A1* | 12/2012 | Gruenheid et al. | 707/694 |

OTHER PUBLICATIONS

Oracle; Oracle Application Server Migrating from JBoss 10g Release 3 (10.1.3.1.0); http://sqltech.cl/doc/oas10gR31/migrate.1013/b25219/overview.htm; 2006; pp. 1-5.

McGillin, Barry; Blog Posting Entitled: Migration Features in SQL Developer 3.0; posted at: http://barrymcgillin.blogspot.com; Oct. 18, 2010; pp. 1-2.

McGillin, Barry; Blog Posting Entitled: Scanning Applications; posted at: http://barrymcgillin.blogspot.com; Jun. 17, 2011; pp. 1-2.

* cited by examiner

*Primary Examiner* — Tuan Vu (74) *Attorney, Agent, or Firm* — Kraguljac Law Group, LLC (57) ABSTRACT

Systems, methods, and other embodiments associated with application source code scanning for database migration are described. In one embodiment, a method includes identifying a subset of application source code files that are likely to require modification to access a destination database. The subset of application source code files is scanned for artifact expressions that access a source database and should be changed to access the destination database.

17 Claims, 6 Drawing Sheets

APPLICATION SOURCE CODE SCANNING FOR DATABASE MIGRATION

BACKGROUND

Database migration is the process of transferring data from a source database to a destination database. The source database and the destination database are usually different types of databases with different instruction formats. For example, an enterprise may transfer data stored in a Sybase database to an Oracle database. Many tools are available for transferring the data stored in the database. However, mixed language applications that are configured to access data in the first type of database will need revision as part of the migration process. For example, database calls in an application that accessed the source database will likely need to be revised to access the destination database. Analyzing all source code files associated with a mixed language application to identify portions of the application that should be revised has proven to be an impractical solution.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Revising mixed language applications that access a database being migrated is typically performed in an ad hoc manner because no tools exist that can successfully deal with all of an application's various source code files. The application migration techniques and tools described herein provide a framework for users to create migration rules that efficiently identify and scan source code files to locate artifact expressions that should be revised as part of migration. The rules can be grouped by database type and/or source code type so that appropriate migration rules may be selected depending on the particular database/language combination involved in a migration.

The source code scan performed by the systems and methods herein identifies the types of database calls that are made, the number of calls, and how dispersed the calls are throughout the source code files. The results of the source code scan help estimate the cost to revise the applications as part of a database migration.

In one embodiment, in addition to locating artifact expressions in source code files that will likely require revision, the systems and methods described herein also provide a mechanism for automatically replacing the artifact expressions with replacement expressions that are appropriate for the migration's destination database. Several different types of automatic replacement are disclosed, including textual expression replacement, regular expression replacement, and calls to an external translator that translates an artifact expression into an appropriate replacement expression.

Systems and methods are described herein that provide an application migration tool that efficiently locates artifact expressions in source code files for an application that accesses data in a first database that is being migrated to a second database. Artifact expressions are expressions (e.g., database calls) that will likely need to be changed to properly access the second database. Prior to scanning an application's source code files, the application migration tool filters the source code files to identify a subset of source code files that meet certain recognizer criteria. The recognizer criteria are specified in the migration rules and identify source code files that are likely to contain artifact expressions. Once the subset of source code files is identified, the scanning operation is performed only on the subset of source code files. Scanning a subset of source code files instead of all the source code files greatly improves the performance of the application migration tool.

Each migration rule may also specify artifact expressions that are relevant to the source code file type that meets the recognizer criteria in the migration rule. Thus, scanning is targeted to search only for artifacts that may be found in a given source code file, greatly improving the performance and likelihood of success of the application migration tool.

Figure 1:
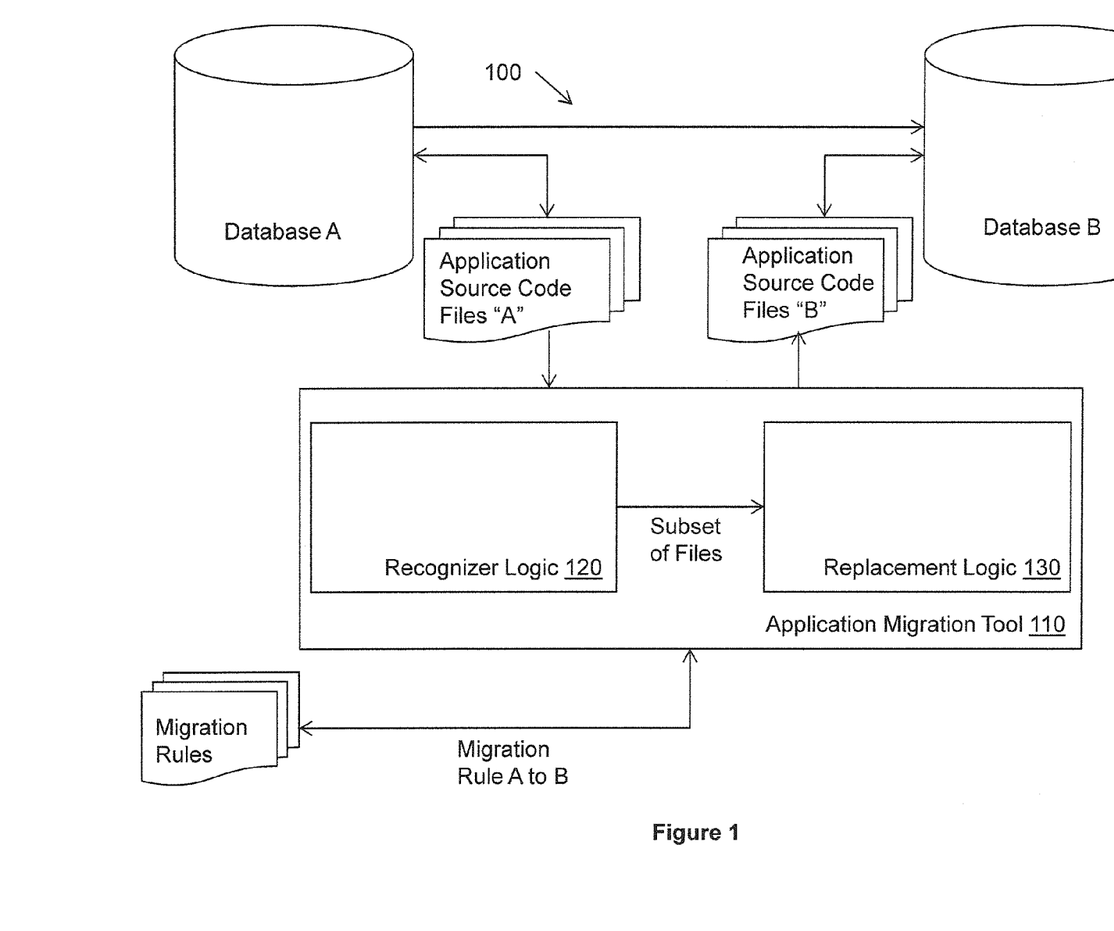
FIG. 1 illustrates one embodiment of a system associated with application source code scanning for database migration.

With reference to FIG. 1, one example embodiment of a computing system 100 associated with application source code scanning for database migration is illustrated. The computing system 100 includes an application migration tool 110 that is configured to access a set of migration rules. The application migration tool 110 uses the migration rules to revise application source code files that access data in a first database of type A to create application source code files that access the same data after the data has been migrated to a second database of type B.

The application migration tool 110 selects a migration rule that is applicable to migration between a database of type A to a database of type B. The application migration tool 110 inputs a set of source code files associated with applications that access data in database A. Using the migration rule, the application migration tool 110 selects a subset of the source code files that are likely to require modification to access the second database. The application migration tool 110 may identify the subset source code files to a user and/or apply one or more replacement rules to the subset of source code files to produce a set of source code files for the applications to access the data in database B.

The application migration tool 110 includes a recognizer logic 120 configured to apply recognizer criteria specified in the migration rule to the set of source code files to select source code files that meet the recognizer criteria for inclusion in the subset. In one embodiment, the recognizer logic 120 is configured to identify a filename extension of the source code files and select source code files having filename extensions specified by the recognizer criteria for inclusion in the subset. The recognizer logic 120 is configured to scan source code files and select source code files that include any of one or more recognizer expressions specified by the recognizer criteria for inclusion in the subset.

In addition to the recognizer criteria used to identify a subset of source code files that are likely to require modification, the migrations rules also include replacement rules that specify an artifact expression and an optional replacement expression. The replacement rules are mapped to the recognizer criteria so that the artifact expressions in a replacement rule are relevant to files of the type that meet the recognizer criteria. The application migration tool 110 includes a replacement logic 130 configured to scan the subset of source code files to identify each occurrence of an artifact expression in the source code files. The replacement logic 130 is further configured to replace each occurrence of the artifact expression with a replacement expression specified by the replacement rule. In this manner, the application migration tool 110 produces revised source code files that include replacement expressions and are able to access data in the database B.

Figure 2:
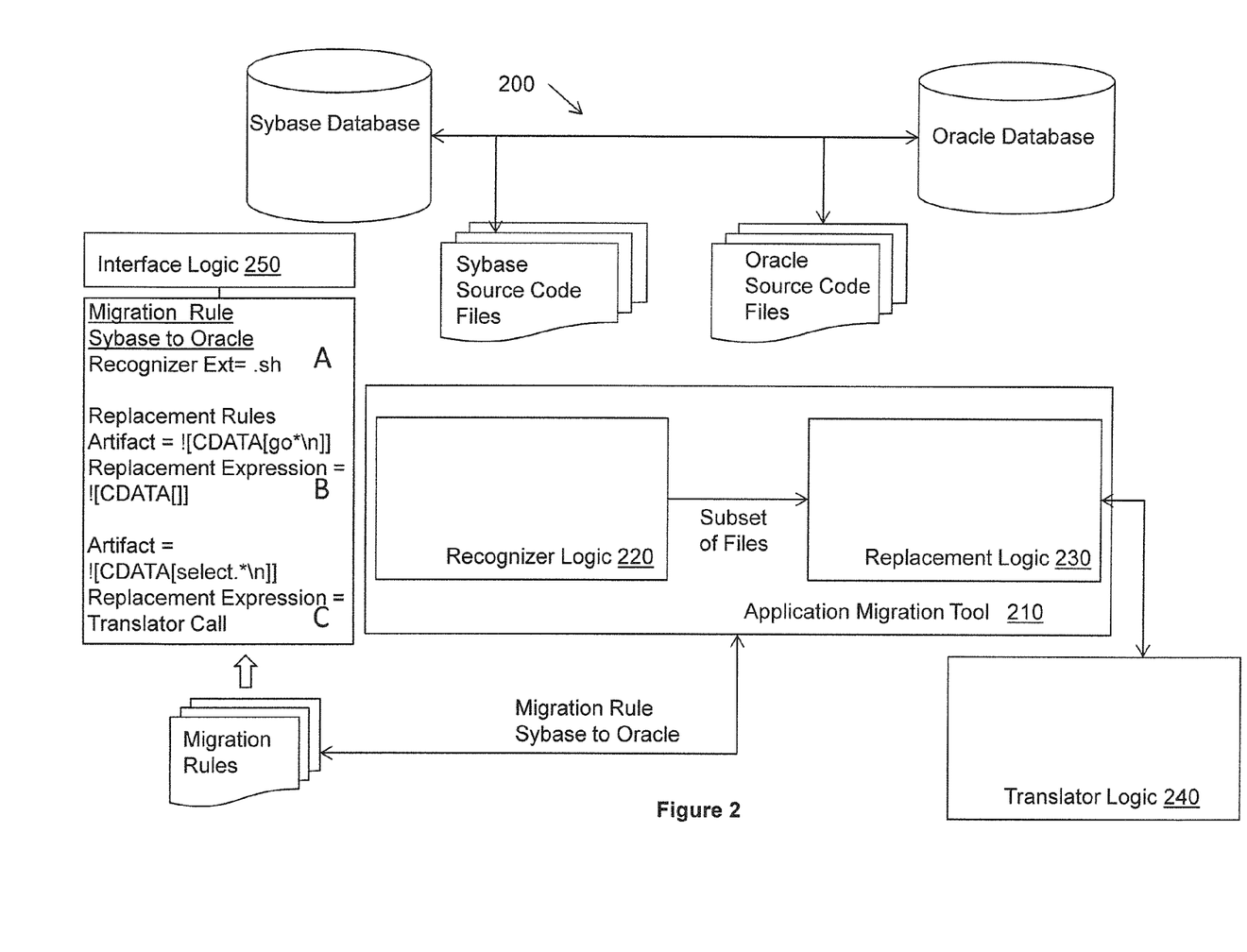
FIG. 2 illustrates one embodiment of a system associated with application source code scanning for database migration.

FIG. 2 illustrates one example embodiment of a computing system 200 associated with application source code scanning for database migration. In the example described in FIG. 2, data from a Sybase type database is being migrated to an Oracle type database. A set of source code files for applications that access data stored in the Sybase database are accessed by an application migration tool 210. The application migration tool 210 selects a migration rule that is appropriate for migrating Sybase databases to Oracle databases. The migration rule may be selected from a set of migration rules that are each mapped to a given source (e.g., Sybase) database type and a given destination (e.g., Oracle) database type.

An example migration rule is illustrated in FIG. 2 and includes a recognizer criteria A and replacement rules B and C. An optional interface logic 250 is provided that allows a user to create and store migration rules for use by the application migration tool 210. Default migration rules may be provided as part of the application migration tool 210 for use by users who do not wish to create their own rules. For the purpose of simplicity, a single migration rule is selected for use in this description. Recognizer criteria and replacement rules may be stored as separate migration rules. Multiple migration rules may be employed to revise application source code files for database migration.

The migration rule illustrated in FIG. 2 is mapped to a source database type Sybase and a destination database type Oracle. The migration rule includes a single recognizer criterion A. The recognizer criterion A specifies a filename extension .sh which designates a shell file. A recognizer logic 220 applies this recognizer criterion to the Sybase application source code files and identifies a subset of source code files that have the filename extension .sh. Multiple recognizer criteria could be applied to the source code files to identify different types of source code files. In addition to the filename extension, other recognizer criteria may be used, such as one or more expressions within a source code file that provide an indication of the type of the source code file. A listing of source code files that meet the recognizer criteria may be provided to a user. The listing can help a user to determine the scope of modifications to be made to application source code files as part of the migration effort.

A replacement logic 230 applies replacement rules B and C to the subset of source code files having the filename extension .sh. Each replacement rule includes an artifact expression and a replacement expression. The artifact expression is an expression that is configured to access the source database. The replacement expression is an expression that is configured to access the destination database in an equivalent manner as the artifact expression. Replacement rule B has an artifact expression of go*\n and a replacement expression of [ ]. (Note that CDATA data clause and parenthesis in the drawings describe the expressions literally in XML). The replacement logic 230 scans the subset of source code files to locate the artifact expression go*\n. Each occurrence of the artifact expression is logged for reporting purposes. The log can help a user to determine the scope of modifications to be made to application source code files as part of the migration effort. The replacement logic 230 may also automatically replace each occurrence of the artifact expression go*\n with the replacement expression [ ], depending on whether a user has requested such automatic replacement.

Replacement rule C has an artifact expression of select*\n and a replacement expression that specifies a translator call. When a translator call is specified, the replacement logic 230 is configured to call a translator logic 240 to translate the artifact expression into an equivalent expression for the source database. The replacement logic 230 scans the subset of source code files to locate the artifact expression select*\n. Each occurrence of the artifact expression select*\n is logged. If automatic replacement is enabled, the replacement logic 230 calls the translator logic 240 to obtain a replacement expression. The replacement logic 230 replaces the artifact expression with the replacement expression. The replacement logic 230 may save the replacement expression provided by the translator logic 240 for subsequent replacements of the artifact expression in the source code file.

Figure 3:
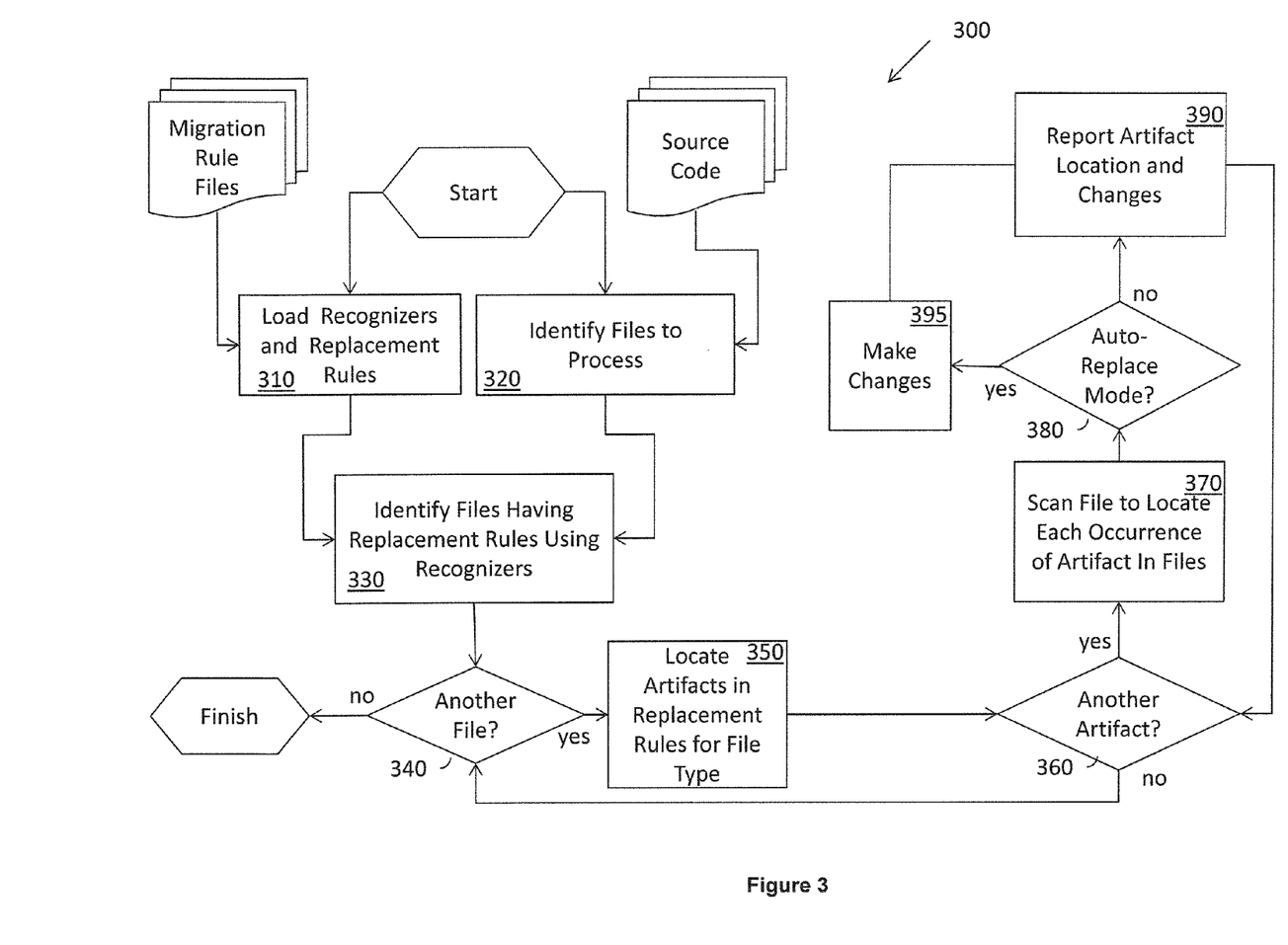
FIG. 3 illustrates one embodiment of a method associated with application source code scanning for database migration.
Figure 4:
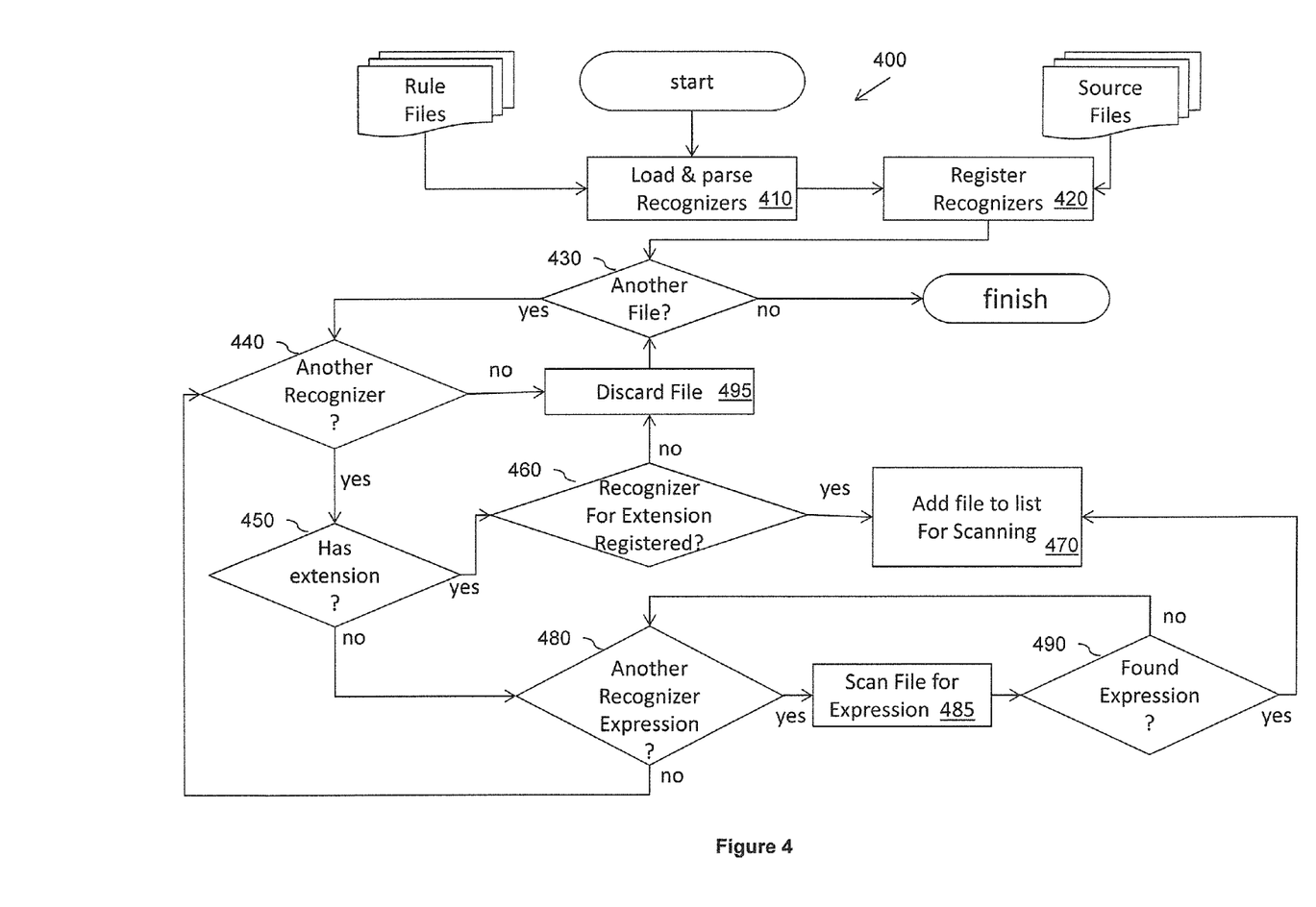
FIG. 4 illustrates an embodiment of a method associated with application source code scanning for database migration.

FIG. 3 illustrates a flow diagram of one example embodiment of a method 300 associated with application source code scanning for database migration. At 310, recognizer criteria and replacement rules are loaded from a repository of migration rules. Some recognizer criteria may identify source file types that are defined as XML. At 320, application source code files that are associated with a database being migrated are identified. At 330, the recognizer criteria are used to identify a subset of source code files that have replacement rules (e.g., are likely to need to be modified as part of migration). For example, shell files may be identified based on a filename extension .sh as having certain replacement rules and C files may be identified based on an extension of .c or .h as having other replacement rules. FIG. 4 illustrates one method of applying recognizer criteria to source code files to identify a subset of source code files for scanning.

At 340 and 350, for each source code file in the subset of source code files, one or more artifact expressions are located in replacement rules for the type of source code file. At 360 and 370, the source code file is scanned for each of the one or more artifact expressions. At 380, a determination is made as to whether automatic replacement is enabled. If automatic replacement mode is not enabled, the artifact locations are reported at 390.

If automatic replacement mode is enabled, at 395 the artifact expressions are replaced with replacement expressions in the replacement rules. A replacement expression may be specified as a text string that replaces the artifact expression. Artifact expressions and replacement expressions may also be specified as regular expressions. Using regular expressions allows recognition of an artifact function signature such as FUNCTION(PARAM1, PARAM2, PARAM3). A replacement expression may be specified as MYNEWFUNCTION (PARAM3, PARAM1, PARAM2). Specifying artifact expressions and replacement expressions as regular expressions provides greater flexibility than text expressions. As discussed with reference to FIG. 2, replacement expressions may be obtained by performing a translator call and receiving a replacement expression passed back from the translator. A record of any replacement of artifacts is reported at 390.

Steps 340-395 are repeated for each source code file in the subset of source code files. Different replacement rules may be specified for different source code file types. Thus, for any given source code file, different artifact expressions may be located in a different replacement rule at 350 and different replacement expressions may be used at 395. Once every source code file has been scanned for artifact expressions, the method 300 is complete.

FIG. 4 illustrates one example embodiment of a method 400 associated with compiling a subset of application source code files for scanning. At 410, multiple recognizers are loaded and parsed from migration rules. A recognizer is a set of recognizer criteria that identify a source code file as being a certain type. Thus, there may be a recognizer for shell files and a recognizer for C files, and so on. At 420, the recognizers are registered for use on one or more source filename extensions. A recognizer may be an XML file that specifies multiple recognizer criteria for a given source file type (e.g., a C file, a shell file). At 430, a determination is made as to whether all source code files have been analyzed for possible inclusion in a subset of source code files that will be scanned for artifact expressions. When no source code files remain for analysis, the method 400 ends.

At 440, for each source code file, a determination is made as to whether recognizer criteria from all recognizers have been applied to the source code file. If the source code file does not meet any of the recognizer criteria the file is discarded (e.g., not added to the subset) at 495. At 450, the source code file's filename is checked to determine if the filename has an extension. If the filename has an extension, at 460, the recognizers are checked to determine if any of the recognizers has been registered for that extension. If a recognizer is registered for the extension, the source code file is added to the subset of source code files that will be scanned at 470. If no recognizer is registered for the extension, the file is discarded (e.g., not added to the subset) at 495.

If the filename does not have an extension, at 480 a determination is made as to whether any recognizers include recognizer expressions. At 485, the source code file is scanned for each recognizer expression in any of the recognizers. At 490, if a recognizer expression is found in the source code file, the source code file is added to the subset of source code files that will be scanned at 470. If no recognizer expression from any recognizer is found in the source code file, the file is discarded (e.g., not added to the subset) at 495.

Figure 5:
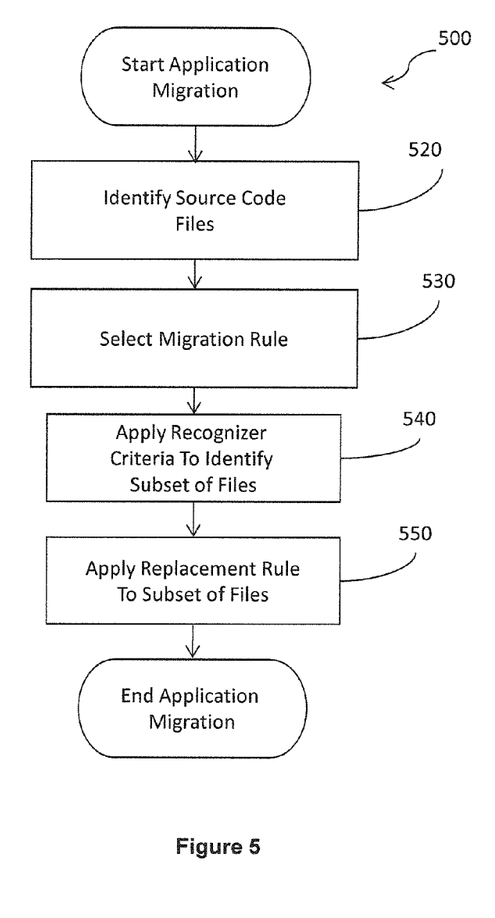
FIG. 5 illustrates an embodiment of a method associated with application source code scanning for database migration.

FIG. 5 illustrates one example embodiment of a method 500 associated with application source code file scanning for database migration. At 510, the method includes identifying a set of source code files for applications that access data in a first database that has been migrated to a second database. At 530, the method includes selecting a migration rule, where a migration rule includes a recognizer criteria and a replacement rule. At 540, the method includes applying the recognizer criteria in the selected migration rule to the set of source code files to identify a subset of source code files that meet the recognizer criteria. At 550, the method includes applying the replacement rule in the selected migration rule to the subset of source code files.

In one embodiment, the recognizer criteria specify one or more filename extensions. The recognizer criteria is applied by identifying a filename extension of the source code files and selecting source code files having one of the filename extensions for the subset. The recognizer criteria may specify one or more recognizer expressions. The recognizer criteria is applied by scanning a source code file to locate any of the one or more recognizer expressions.

In one embodiment, each replacement rule specifies an artifact expression. The replacement rule is applied by scanning a source code file to identify each occurrence of the artifact expression. The artifact expression may be a text expression or a regular expression. A location of each occurrence of the artifact expression in the source code file may be returned by the method.

In one embodiment, the method includes replacing each occurrence of the artifact expression with a replacement expression specified in the replacement rule to produce a second application adapted to access the second database.

In one embodiment, the method includes passing the artifact expression to a translator and receiving a replacement expression from the translator. Each occurrence of the artifact expression is replaced with the replacement expression to produce a second application adapted to access the second database.

Selection of a migration rule may be performed by accessing a set of migration rules and selecting a migration rule that is mapped to i) a first database type of the first database and ii) a second database type of the second database.

General Computer Embodiment

Figure 6:
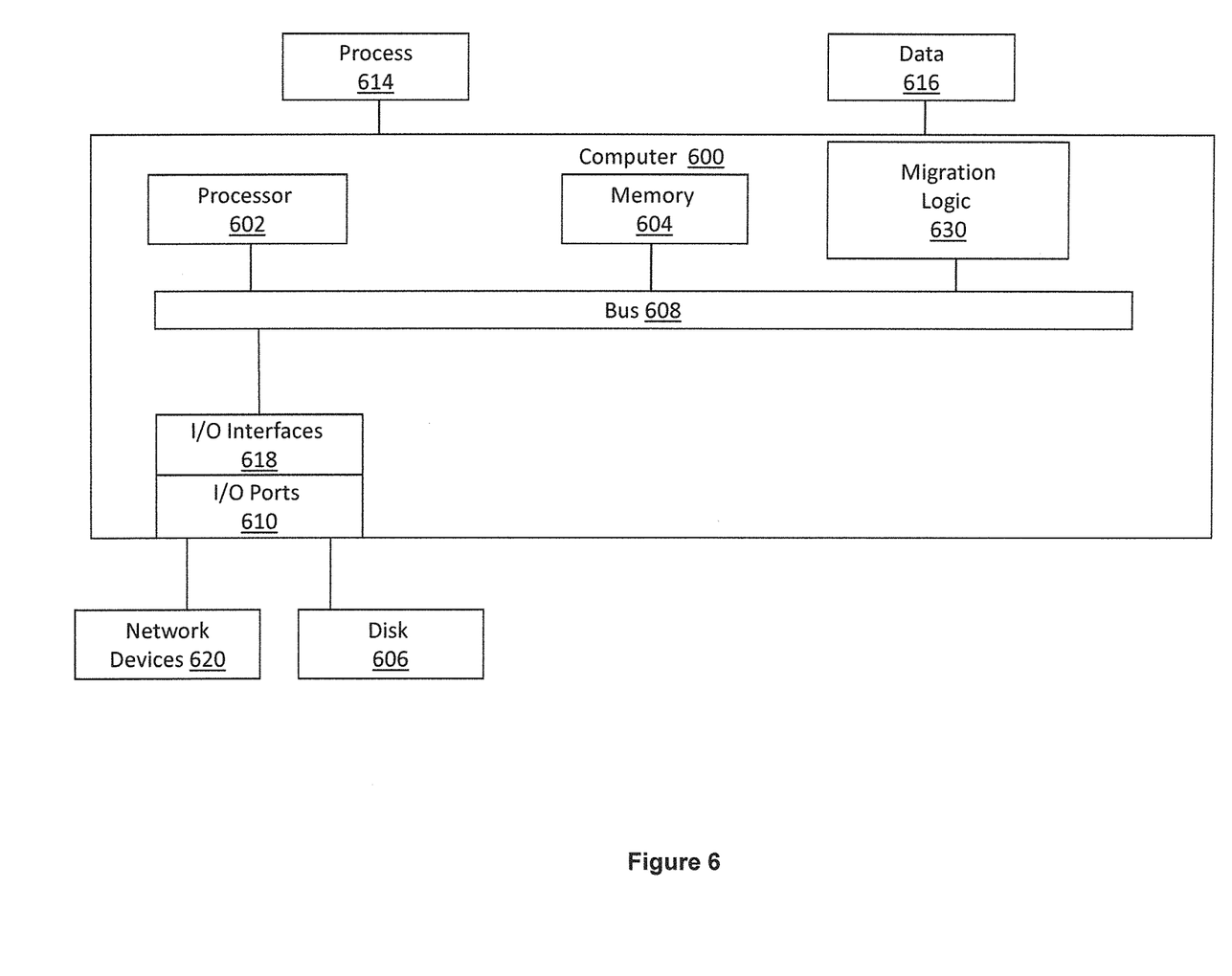
FIG. 6 illustrates an embodiment of a computing system in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a migration logic 630 configured to facilitate application source code scanning for database migration. In different examples, the migration logic 630 may be implemented in hardware, a non-transitory computer-readable medium with stored instructions, firmware, and/or combinations thereof. While the migration logic 630 is illustrated as a hardware component attached to the bus 608, it is to be appreciated that in one example, the logic 630 could be implemented in the processor 602.

In one embodiment, logic 630 is a means (e.g., hardware, non-transitory computer-readable medium, firmware) for application source code scanning for database migration.

The means may be implemented, for example, as an ASIC programmed to perform application source code scanning for database migration. The means may also be implemented as stored computer executable instructions that are presented to computer 600 as data 616 that are temporarily stored in memory 604 and then executed by processor 602.

The migration logic 630 may also provide means (e.g., hardware, non-transitory computer-readable medium that stores executable instructions, firmware) for identifying a set of source code files for applications that access data in a first database that has been migrated to a second database; selecting a migration rule, where a migration rule includes a recognizer criteria and a replacement rule; applying the recognizer criteria in the selected migration rule to the set of source code files to identify a subset of source code files that meet the recognizer criteria; and applying the replacement rule in the selected migration rule to the subset of source code files.

The migration logic 630 may also provide means (e.g., hardware, non-transitory computer-readable medium that stores executable instructions, firmware) for providing an interface for receiving one or more recognizer criteria for identifying source code files for a set of first applications that access data in a first database that are likely to require modification to access a second database; associating the recognizer criteria with one or more replacement rules that map replacement expressions to artifact expressions in source code files, where replacing corresponding artifact expressions with corresponding replacement expressions revises the source code file to produce a set of second applications that access the second database; and storing the one or more recognizer criteria and replacement rules for future processing.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods outlined in FIGS. 1-5.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

XML refers to extensible markup language. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data on a non-transitory computer readable medium. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to adapt a first application that accesses data in a first database that has been migrated to a second database to produce a second application that accesses the data in the second database, where the first application includes source code files that include a command that accesses the first database and source code files that do not include a command that accesses the first database, the instructions comprising instructions for:

identifying the source code files associated with the first application;

determining a first database type that characterizes the first database and a second database type that characterizes the second database;

accessing computer-readable storage medium storing one or more migration rules, where each migration rule maps a source database type and a target database type;

selecting a migration rule that is associated with the first database type as a source database type and the second database type as a target database type, where the migration rule includes i) a recognizer criterion to be used to identify source code files that include a command that accesses databases of the first database type and a ii) a replacement rule to be used to adapt a source code file that includes a command that accesses databases of the first database type to a revised source code file that includes a command that accesses databases of the second database type;

where the recognizer criterion comprises a characteristic of a source code file that indicates that the source code file includes a command that accesses the first database;

identifying a subset of source code files that meet the recognizer criterion;

where the replacement rule specifies at least i) a first artifact expression comprising an executable database command that accesses the data in the first database in a given manner and ii) a first replacement expression, mapped to the first artifact expression, where the first replacement expression comprises an executable database command that accesses the data in the second database in the given manner;

for each source code file in the subset, producing a corresponding revised source code file that includes commands that access the data in the second database by:
      scanning the source code file to identify the first artifact expression;
      replacing the first artifact expression with the first replacement expression, and
   creating the second application by combining the revised source code files and the source code files not in the subset.

2. The non-transitory computer-readable medium of claim 1, where the recognizer criterion specifies one or more filename extensions and where the instructions for applying the recognizer criterion comprise instructions for identifying a filename extension of the source code files and selecting source code files having one of the filename extensions for the subset.

3. The non-transitory computer-readable medium of claim 1, where the recognizer criterion specifies one or more recognizer expressions, and further where the instructions for applying the recognizer criterion comprise instructions for scanning a source code file to locate any of the one or more recognizer expressions.

4. The non-transitory computer-readable medium of claim 1, where the artifact expression is a text expression.

5. The non-transitory computer-readable medium of claim 1, where the artifact expression is a regular expression.

6. The non-transitory computer-readable medium of claim 1, where the instructions further comprise instructions for returning a location of each occurrence of the artifact expression in the source code file.

7. The non-transitory computer-readable medium of claim 1, where the instructions further comprise instructions for replacing each occurrence of the artifact expression with a replacement expression specified in the replacement rule to produce the revised source code file.

8. The non-transitory computer-readable medium of claim 1, where the instructions further comprise:
   instructions for passing the first artifact expression to a translator;
   instructions for receiving the first replacement expression from the translator; and
   instructions for replacing each occurrence of the artifact expression with the replacement expression.

9. A computing system that adapts a first application that accesses data in a first database that has been migrated to a second database to produce a second application that accesses the data in the second database, where the first application includes source code files that include a command that accesses the first database and source code files that do not include a command that accesses the first database, the system comprising:
   computer-readable medium configured to store a set of migration rules, where each migration rule is associated with a source database type and a target database type;
   recognizer logic configured to:
      determine a first database type that characterizes the first database and a second database type that characterizes the second database;
      select a migration rule that is associated with the first database type as a source database type to the second database type as the target database type;
      where the migration rule includes i) a recognizer criterion to be used to identify source code files that include a command that accesses databases of the first database type and ii) a replacement rule to be used to adapt a source code file that includes a command that accesses databases of the first database type to a revised source code file that includes a command that accesses databases of the second database type;
      where the recognizer criterion comprises a characteristic of a source code file that indicates that the source code file includes a command that accesses the first database;
      where the replacement rule specifies at least i) a first artifact expression comprising an executable database command that accesses the data in the first database in a given manner and ii) a first replacement expression, mapped to the first artifact expression, where the first replacement expression comprises an executable database command that accesses the data in the second database in the given manner;
      input the source code files associated with the first application;
      identify a subset of the source code files that meet the recognizer criteria;
      such that at least one source code file in the set of source code files is not in the subset; and
   replacement logic configured to, for each source code file in the subset of source code files, produce a corresponding revised source code file by:
      scanning the source code file to identify the first artifact expression;
      replacing the first artifact expression with the first replacement expression; and
      create the second application by combining the revised source code files and the source code files not in the subset.

10. The computing system of claim 9, where the recognizer logic is configured to identify a filename extension of the source code files and select source code files having filename extensions specified by the recognizer criterion for inclusion in the subset.

11. The computing system of claim 9, where the recognizer logic is configured to scan source code files and select source code files that include any of one or more recognizer expressions specified by the recognizer criterion for inclusion in the subset.

12. The computing system of claim 9, where the replacement logic is configured to:
   pass the identified first artifact expression to a translator;
   receive the replacement expression from the translator; and
   replace each occurrence of the first artifact expression with the replacement expression.

13. A computer-implemented method that adapts a first application that accesses data in a first database that has been migrated to a second database to produce a second application that accesses the data in the second database, where the first application includes source code files that include a command that accesses the first database and source code files that do not include a command that accesses the first database, the method comprising:
   identifying the source code files associated with the first application;
   determine a first database type that characterizes the first database and a second database type that characterizes the second database;
   accessing computer-readable storage medium storing one or more migration rules, where each migration rule is associated with a source database type and a target database type;
   selecting a migration rule that is associated with the first database type as a source database type and the second database type as a target database type, where the migration rule includes i) recognizer criterion to be used to identify source code files that include a command that accesses databases of the first database type and a ii) a replacement rule to be used to adapt a source code file that includes a command that accesses databases of the first database type to a revised source code file that includes a command that accesses databases of the second database type;
   where the recognizer criterion comprises a characteristic of a source code file that indicates that the source code file includes a command that accesses the first database;
   identifying a subset of source code files that meet the recognizer criterion;
   where the replacement rule specifies at least i) a first artifact expression comprising an executable database command that accesses the data in the first database in a given manner and ii) a first replacement expression, mapped to the first artifact expression, where the first replacement expression comprises an executable database command that accesses the data in the second database in the given manner;
   for each source code file in the subset, producing a corresponding revised source code file that includes commands that access the data in the second database by:
      scanning the source code file to identify the first artifact expression; and
      replacing the first artifact expression with the first replacement expression; and creating the second application by combining the revised source code files and the source code files not in the subset.

14. The computer-implemented method of claim 13, where the recognizer criterion specifies one or more filename extensions and where applying the recognizer criterion comprises identifying a filename extension of the source code files and selecting source code files having one of the filename extensions for the subset.

15. The computer-implemented method of claim 13, where the recognizer criterion specifies one or more recognizer expressions, and further where applying the recognizer criterion comprises scanning a source code file to locate any of the one or more recognizer expressions.

16. The computer-implemented method of claim 13, further comprising replacing each occurrence of the artifact expression with a replacement expression specified in the replacement rule to produce the revised source code.

17. The computer-implemented method of claim 13, further comprising:
  passing the first artifact expression to a translator;
  receiving the first replacement expression from the translator; and
  replacing each occurrence of the artifact expression with the replacement expression.

\* \* \* \* \*